Patented June 26, 1934

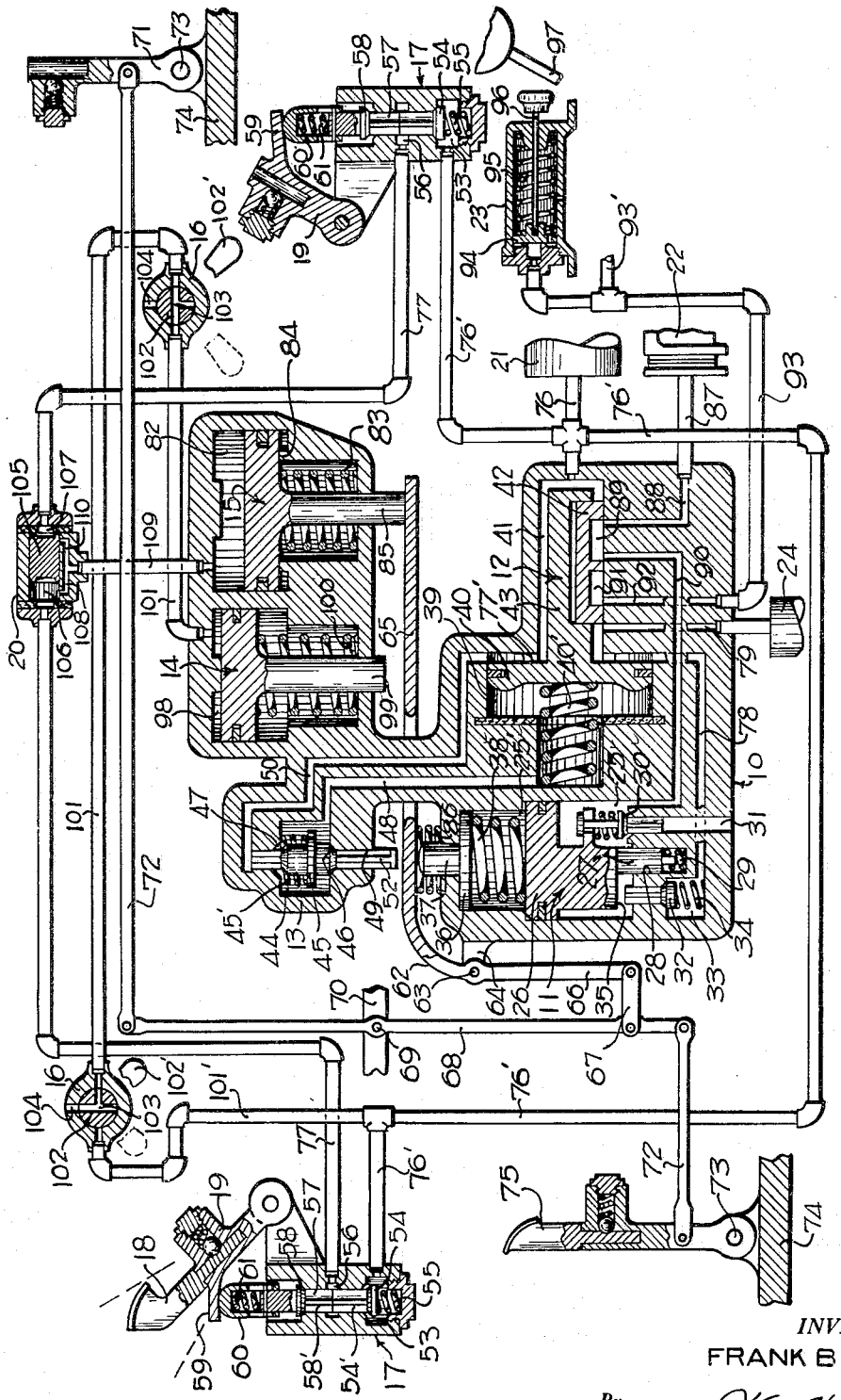

1,964,094

UNITED STATES PATENT OFFICE 1,964,094

SAFETY CONTROL EQUIPMENT

Frank B. Thomas, Forest Hills, Pa., assignor to The Westinghouse Air Brake Company, Wilmerding, Pa., a corporation of Pennsylvania Application December 24, 1931, Serial No. 582,924

19 Claims. (Cl. 303—19)

This invention relates to safety car control equipment in which the brakes are normally manually controlled by the operator and in which an automatic application is effected upon incapacitation or inattentiveness on the part of the operator.

The primary object of the present invention is the provision of an improved and simplified safety car control equipment in which successful operation is assured and the number of operating devices utilized to obtain the desired safety features is materially reduced.

A further object of the present invention resides in the provision of an improved brake valve device containing safety features and novel means for rendering the brake valve device effective to insure proper operation of the safety features and also proper application of the brakes.

Another object of the invention resides in the provision of improved means in safety car equipment under the control of the power controlling device for retaining the operating lever of the brake valve device in a release position as long as the power control device is under the attentive care of the operator.

A further object of the present invention lies in the provision of improved means for effecting an application of the brakes and retaining the brakes applied while a change-over is being made to shift the control of the car from one end to the other.

A more specific object of the present invention may be found in the structure of the brake valve device which includes means operative in a single device to insure the effective operation of both the safety features and the application of the brakes.

Another object lies in the novel combination and arrangement of parts which are operatively connected to provide an improved safety car control equipment.

Other objects and advantages will appear from the following description of an illustrative embodiment of the present invention.

The single figure of the drawing is a diagrammatic view showing a double end safety car control equipment embodying my invention and having the principal parts shown in section.

The equipment may comprise a casing 10 containing a self-lapping brake valve device 11, an emergency valve device 12, an emergency pilot valve device 13, a service interlock piston 14, and a power interlock piston 15. A pair of plug valves 16, connected in series, one of which is positioned at each end of the car and adapted to be individually manually operable at the operating end of the car, serve together to control the operation of the service interlock piston 14. A pair of power interlock valve devices 17, one of which is positioned at each end of the car, are adapted to be rendered operative by the application of a removable foot pedal 18 to a valve operating lever 19 at the operating end of the car. A double check valve device 20 is connected between the power interlock valve devices 17 and serves to control the flow of fluid under pressure which operates the power interlock piston 15. Additional equipment, in the form of a main reservoir 21, a brake cylinder 22, a knock-out cylinder 23, and a sanding reservoir 24 complete the present equipment.

The brake valve device 11 is preferably of the straight air self-lapping type and may comprise a casing 10 having a chamber 25 containing a movable piston 26 having a stem 27 adapted for reciprocation in a bore 28 to guide the movement of the piston. A coil spring 29 confined between the stem 27 and the end of the bore 28 serves to normally retain the piston in its raised position so that an exhaust valve 30 which is yieldably mounted on a portion of the piston is normally held unseated to connect the chamber 25 to the atmosphere, through a passage 31 within which the fluted stem of the valve 30 is guided. A supply valve 32 contained in a chamber 33 is normally maintained in seated position by the action of a coil spring 34. The fluted stem of the valve 32 projects into the chamber 25 and is adapted to be depressed to unseat the valve 32, under the action of an abutment 35 which forms a part of the piston 26 to control communication between the chambers 33 and 25 when the piston 26 is actuated in a manner to be hereinafter described. A plunger 36 contained in a chamber 25' above the piston 26 is provided with an operating pin 37 which projects through the casing 10 and is adapted to be moved to compress a spring 38 confined in the chamber 25' between the plunger 36 and piston 26 to urge the piston downwardly against the action of the coil spring 29 to cause the exhaust valve 30 to be seated and the supply valve 32 to be unseated.

The emergency valve device 12 may comprise a piston 40 contained in a piston chamber 39 formed in the casing 10 and having a valve chamber 41 at the opposite side of the piston 40 containing a slide valve 42 adapted to be operated by a stem 43 formed integral with the piston 40. A coil spring 40' urges the piston 40 to the position shown in the drawing.

The emergency pilot valve device 13 may comprise a double beat valve 45 contained in chamber 44 of the casing 10 and cooperating with valve seats 46 and 47 to respectively control the flow of fluid under pressure from the piston chamber 39 to the atmosphere through a passage 48, chamber 44 and exhaust port 49 and the flow of fluid under pressure from the valve chamber 41 to the piston chamber 39 through a passage 50, chamber 44 and passage 48. A coil spring 45' contained in the chamber 44 normally urges the double beat valve 45 to its lowermost position in which it engages the seat 46. The valve 45 is provided with a fluted guide stem 52 extending beyond the casing 10 and adapted to be actuated to move the double beat valve 45 into engagement with the seat 47.

Each of the power interlock valve devices 17 may comprise a casing having a valve chamber 53 connected through pipe 76' with the main reservoir 21 and containing a valve 54 provided with a stem 54'. The stem 54' is adapted to engage a stem 58' of a valve 58 so that when the valve 54 is seated, the valve 58 is unseated, and vice versa. A coil spring 55 normally urges the valve 54 to its seat. A chamber 56 which is formed in the casing intermediate the valves 54 and 58 is connected to a pipe 77 leading to the double check valve 20. The chamber 56 is thus adapted to be selectively connected either with the chamber 53 or the atmosphere through the unitary movement of the valves 54 and 58. The valves 54 and 58 are adapted to be actuated by the manipulation of the valve operating lever 19 provided with an abutment 59 adapted to engage a cap 60 which is attached to the valve 58 by means of a pin and slot connection. The cap 60 contains a coil spring 61 confined between it and the upper extremity of the valve 58 so as to provide a yieldable means for transmitting pressure from the pedal 19 to actuate the valves 58 and 54.

The double check valve device 20 may comprise a casing provided with a bore containing a floating piston 105 which divides the bore into chambers 106 and 107 lying respectively at the left and right sides of the piston 105. In one seating position of the double check valve device, as shown in the drawing, the chamber 106 is connected through a passage 108 to a pipe 109 leading to the power interlock piston device 15 and in the opposite position the chamber 107 is connected through a passage 110 to the pipe 109.

A brake valve operating lever 62 is pivotally mounted on a pin 63 carried by a boss 64 formed on the valve casing 10. The lever 62 is provided with a brake valve actuating portion 65 which projects between brake valve operating pin 37 and the fluted stem 52 of the double beat emergency pilot valve device 13, so that by its movement either element may be actuated. Another portion 66 of the lever 62 is connected by means of a link 67 to one side of an equalizing bar 68 which is pivotally mounted at its mid point on a pin 69 carried by a fixed support 70. The ends of the bar 68 are operatively connected to brake operating levers 71 by means of rods 72. The brake operating levers 71 are positioned one at each end of the car and are rockably mounted on pins 73 carried by fixed supports 74. These levers 71 are adapted to be selectively operated by the application of pressure to a foot pedal 75 which is removably mounted in a socket formed in the lever 71.

With the main reservoir 21 charged in the usual manner and the power pedal 18 depressed to "power off" position on the operating end of the car (the left hand end as shown in the accompanying drawing), fluid under main reservoir pressure will flow through pipe 76 to charge the valve chamber 41 of the emergency valve device 12 and thence through passage 50, past the unseated valve 45, chamber 44, passage 48 to charge the piston chamber 39. With the fluid pressures in chambers 39 and 41, which are disposed at opposite sides of the piston 40, being equal, a coil spring 40' will urge the piston 40 to its extreme right hand or release position against a stop 77'. From chamber 41 fluid under pressure will also flow through a passage 78 to charge the chamber 33 and through a passage 79 to charge the sanding reservoir 24. Fluid under pressure from the main reservoir 21 will also flow through branch pipes 76' to the chambers 53 in the power interlock valve devices 17. At the operating end of the car, where the pedal 19 is held in "power off" position, the valve 54 will be unseated under the action of the pedal and permits fluid under pressure to flow past the open valve 54, through chamber 56, and a pipe 77 to piston chamber 106 in the double check valve device 20. Pressure in the chamber 106 will cause the piston 105 to be moved to the right to uncover a passage 108 formed in the casing and permit fluid under pressure to flow through a pipe 109 to a chamber 82 formed in the casing 10 and containing the power interlock piston device 15. The pressure in the chamber 82 will cause the piston 15 to move downwardly against the pressure of a coil spring 83 until it has reached its extreme lower position in which it abuts a stop 84 formed in the chamber 82. A stem 85 carried by the piston 15 will in this manner, be brought into contact with the extended portion 65 of the brake valve operating lever 62 to retain it in release position against the action of a coil spring 86 which normally urges it toward its emergency or dead man's application position. With the emergency valve device in the position shown, the brake cylinder 22 is connected to the atmosphere through pipe 87, a passage 88, a cavity 89 formed in the slide valve 42, a passage 90, chamber 25 in the brake valve device, past the unseated exhaust valve 30 and the passage 31.

To effect a service application of the brakes, the brake pedal 75, which is positioned at the operating end of the car, is depressed, causing the lever 71 to rock upon its fulcrum and move the rod 72 which in turn effects a clockwise rotation of the equalizing bar 68 and causes the brake lever 62 to be rotated in a clockwise direction under the action of the connecting link 67. The clockwise rotation of the brake lever 62 will cause the portion 65 to overcome the resistance of the spring 86 and effect a downward movement of the pin 37, which in turn will compress the spring 38 and effect a downward movement of the piston 26. As the piston 26 moves downwardly, the valve 30 will be seated and the valve 32 will be unseated under the action of the abutment 35 against the end of the fluted stem of the valve 32. The unseating of the valve 32 will permit fluid under main reservoir pressure to flow to the brake cylinder 22 past the open valve 32, chamber 25, passage 90, cavity 89 in the slide valve 42, passage 88 and pipe 87 to effect a service application of the brakes. The degree of pressure obtainable in such an application is dependent entirely upon the will of the operator and varies directly with the movement of the pedal 75. Since the brake valve device of the present device is of the self-lapping type, it will also be understood that the desired degree of pressure will be maintained in the brake cylinder through the action of the valve so long as the operator maintains pressure upon the brake pedal.

To release the brakes after a service application, pressure is relieved from the pedal 75 and the spring 86 then becomes effective to return the brake lever 62 to the release position shown in the drawing. The release of pressure upon the pin 37 will permit the piston 26 to be moved upwardly under pressure of the fluid in the chamber 25 and the exhaust valve 30 will be unseated to vent fluid under pressure from the brake cylinder, in a manner previously described, to release the brakes.

An emergency or dead man's application of the brakes is automatically effected when pressure is removed from both the power pedal and the brake pedal at the operating end of the car.

When pressure is removed from the power pedal 18, the spring 55 will seat the valve 54 to cut off the supply of fluid under pressure to the power interlock piston 15 and simultaneously effect the unseating of the exhaust valve 58 which will permit fluid under pressure in the piston chamber 82 to be vented to the atmosphere through pipe 109, passage 108, piston chamber 106, pipe 77, chamber 56 and past the unseated exhaust valve 58. When the piston chamber 82 is thus vented, the coil spring 83 will cause the piston 15 to move upwardly and carry the stem 85 away from the extended portion 65 of the brake lever 62. As the end of the stem 85 moves away from the brake lever, pressure having been removed from the pedal 75, as previously stated, the spring 86 causes the lever 62 to be rocked upwardly to engage the fluted stem of the double beat valve 45 and shift it against the action of the spring 45' to engage the seat 47 to cut off further supply of fluid under pressure from the main reservoir 21 to the piston chamber 39 and simultaneously unseat the valve 45 from the seat 46 to vent fluid under pressure from the piston chamber 39 to the atmosphere through passage 48, chamber 44, past the unseated valve and through passage 49. The venting of fluid from the piston chamber 39 will permit the piston 40 to be moved to the left under main reservoir fluid pressure contained in the valve chamber 41 to compress the coil spring 40' and effect a movement of the slide valve 42 to its emergency position. When the slide valve 42 is thus moved to its emergency position under the action of the piston 40 and valve stem 43, the passage 88 is uncovered by the slide valve 42 and fluid under main reservoir pressure flows from the valve chamber 41 to the brake cylinder 22 through passage 88 and pipe 87 to effect an emergency or dead man's application of the brakes. When the slide valve 42 is in its emergency position, the sanding reservoir 24 which is charged with fluid under main reservoir pressure is connected to the power knock-out cylinder 23 and the sanding mechanism (not shown) through passage 79, a cavity 91 in the slide valve 42, a passage 92, and a pipe 93. The pipe 93 is provided with a branch 93' which is connected to the usual sanding mechanism to supply it with fluid under pressure to effect a sanding of the rails when an emergency brake application is made. The fluid supplied to the knock-out cylinder 23 from the sanding reservoir 24 causes a piston 94 contained in the cylinder 23 to be moved to the right against the pressure of a coil spring 95 and effects breaking of the power circuit by shifting a piston rod 96 carried by the piston into engagement with a circuit breaking switch lever 97 to cause the same to be shifted to circuit breaking position. It will thus be seen that when an emergency application of the brakes is effected, power is automatically cut off, sanding of the rails is automatically effected and the brakes are applied by supplying fluid at main reservoir directly to the brake cylinder.

To effect a release of the brakes after an emergency or dead man's application, the circuit breaking switch lever should be manually thrown to its circuit closing position, as shown in the drawing. This may readily be done, due to the fact that when the pressure of fluid in the sanding reservoir 24 has blown down, the pressure of the spring 95 in the knock-out cylinder is sufficient to return the piston to its normal inactive position, in which the rod 96 is retracted to permit manual manipulation of the switch lever 97. The power pedal 18 may then be depressed until the abutment 59 formed on the lever 18 has depressed the cap 60 sufficiently to compress the spring 61 enough to overcome the spring 55, at which time the valve 58 will seat to cut off the atmospheric connection of the chamber 82 and the valve 54 will be unseated to permit fluid at main reservoir pressure to be supplied to the piston chamber 82, forcing the piston 15 and its associated stem 85 downwardly against the pressure of the spring 83 and causing the brake lever 62 to be moved to its release position against the action of the coil spring 86. As the brake lever moves downwardly, the coil spring 45' in the emergency pilot valve device 13 will become effective to move the valve into engagement with the seat 46 to cut off the atmospheric connection of the piston chamber 39 and to reestablish communication between the main reservoir 21 and the chamber 39 by unseating the valve 45 from seat 47. The establishment of this connection will effect an equalization of fluid pressure on the opposite sides of the piston 40 and the piston 40 will be moved to the right under the pressure of the spring 40', thus causing the slide valve 42 to be shifted to its release position, as shown in the drawing, and permits the fluid under pressure in the brake cylinder to be vented to the atmosphere to release the brakes, in the manner previously set forth. When the emergency valve device is thus shifted, the sanding reservoir will again be charged from the main reservoir and to insure proper operation of the sanding device and knock-out cylinder upon the initiating of another emergency application of the brakes.

To insure the maintenance of a braking pressure during the process of changing ends, or shifting the control from one end of the car to the other, I have included a service interlock piston device, which may comprise a piston 14 contained in a chamber 98 formed in the casing 10. The piston 14 carries a stem 99 which projects through the casing 10 and is adapted upon movement to engage and actuate the brake operating lever 62. A coil spring 100 surrounding the stem 99 serves to normally maintain the piston 14 in its inoperative position. The piston chamber 98 is connected to the main reservoir 21 through a pipe 98', a plug valve 102, pipe 101, a second plug valve 102, pipe 101' and pipe 76'. The plug valves 102 are thus serially connected and disposed at opposite ends of the car.

Each plug valve device 16 may comprise a casing containing a plug valve 102 having a three-way passage 103 formed therein. The plug valves 102 are each adapted to be manually manipulated by a handle 102' operatively connected thereto. At the operating end of the car, shown in the drawing as at the left hand end, the plug valve 102 is positioned so that the supply of fluid under pressure from the main reservoir 21 to the service interlock piston device 14 is blocked. At the non-operating, or right hand end, the plug valve is positioned as shown in the drawing, so that the passage 103 in that plug valve connects pipes 98' and 101 to establish an atmospheric connection for the chamber 98 through passage 103 and exhaust port 104 in the plug valve 102 positioned at the operating end of the car.

When a shifting of controls from one end of the car to the other is desired, the handle 102' on the plug valve device 16 on the operating end of the car should be swung from the full line position to the dotted line position, as shown at the left in the drawing, this movement of the handle 102' will cause the plug valve 102 to be rotated in a clockwise direction and place the pipe 76' in direct communication with pipe 101 through the passage 103 and thus permit fluid under pressure from the main reservoir to flow to the piston chamber 98 through pipes 76' and 101', plug valve 102 at the operating end of the car, pipe 101, plug valve 102 at the non-operating end of the car and pipe 98' to charge the chamber 98 with fluid under pressure, causing the piston 14 contained therein to be moved to its lowermost position against the action of the coil spring 100. As the piston moves downwardly the stem 99 contacts with the extended portion 65 of the brake valve operating lever 62 and causes it to be moved downwardly against the action of the spring 86 and forces the valve operating pin 37 downwardly to compress the spring 38 and cause the piston to move downwardly to seat the exhaust valve 30 and cause the supply valve 32 to be unseated to permit fluid under pressure to flow from the main reservoir 21 to the brake cylinder 22 in a manner previously described, in connection with a service application of the brakes. With the brakes thus applied and the lever 62 maintained in service position by the pressure of fluid in the piston chamber 98, the operator may then remove both the brake pedal 75 and the power pedal 18 from their respective sockets in levers 71 and 19 and convey them to the other end of the car where they may then be applied to the levers 71 and 19. After positioning them in this manner, pressure may be applied to the power pedal to depress it to "power off" position where it will be operative in a manner previously described to charge the power interlock piston device to effect a movement of the stem 85 to a position adapted to prevent the movement of the brake operating lever 62 beyond its release position. With the power pedal maintained in this position, the handle 104 of the plug valve device 16, at the present controlling end of the car, may be swung from the full line position shown in the drawing at the right to the dotted line position. The movement of the handle 102' will cut off the supply of fluid under pressure from the main reservoir to the service interlock piston device 14 and simultaneously vent the piston chamber 98 to the atmosphere through pipe 98' and passages 103 and 104 and causes the piston 14 to be moved upwardly under action of the coil spring 100. As the piston 14 moves upwardly, the brake operating lever will be forced upwardly under the action of the spring 86 and follows the movement of the retracting stem 99 until the lever comes into abutting position with the stem 85 of the power interlock piston device 15 where its movement will be arrested. As the lever 62 is thus moved upwardly, pressure is relieved from the top of piston 26 in the brake valve device 11 and the piston will move upwardly under the action of the coil spring 29 to permit the supply valve 32 to be closed under action of the coil spring 34 and effect the opening of the exhaust valve 30. As the exhaust valve 30 is unseated, fluid under pressure is vented from the brake cylinder 22 in the usual manner and the braking pressure is relieved. The car will then be ready for operation and control from the former inoperative end in the identical manner as previously described.

While the foregoing description has dealt exclusively with the control of the car by means of a pair of foot pedals, it will be understood that the power control pedal may readily be replaced by a hand operated device including a power interlock valve device similar to the one previously described.

It will readily be seen that an improved safety car control equipment has been provided in which novel means have been incorporated to insure an emergency or dead man's application of the brakes upon the release of pressure from both of the pedals and the provision of improved means for retaining the brake operating lever 62 in release position when the power pedal is depressed to any position from "power off" to its extreme power on position. A further advantage will be seen in the provision of means in the form of a pair of plug valve devices serially connected and individually operable from the control end of the car to effect a service application of the brakes to facilitate the effecting of a change over of controls from one end of the car to the other.

While the invention has been described in considerable detail in the foregoing specification, it will be understood that various changes may be made in its embodiment without departing from or sacrificing any of the advantages hereinafter claimed.

Having now described my invention, what I claim as new and desire to secure by Letters Patent, is:

1. In a safety car control equipment, the combination with a power cylinder and a brake valve device operative to effect the supply of fluid under pressure to the power cylinder, of a manually operable member, an element operated by said member for operating said brake valve device, valve means operated by said element upon release of said manually operable member for controlling the supply of fluid under pressure to the power cylinder, fluid pressure operated means for preventing the operation of said valve means by said element, and a manually operable power controlling means for controlling the operation of said fluid pressure operated means.

2. In a safety car control equipment, the combination with a brake cylinder and a brake valve device operative to effect the supply of fluid under pressure to the brake cylinder, of a manually operable member, an element operated by said member for operating said brake valve device, valve means operated by said element upon release of said manually operable member for controlling the supply of fluid under pressure to the brake cylinder, means operated by fluid under pressure for preventing the operation of said element to operate said valve means, and a manually operable power controlling means for controlling the supply of fluid under pressure to said fluid pressure operated means.

3. In a safety car control equipment, the combination with a brake cylinder and a brake valve device operative to effect the supply of fluid under pressure to the brake cylinder, of a manually operable member, an element operated by said member for operating said brake valve device, valve means operated by said element upon release of said manually operable member for controlling the supply of fluid under pressure to the brake cylinder, means operated by fluid under pressure for operating said element to effect the operation of said brake valve device, and a manually controlled valve for controlling the supply of fluid under pressure to said fluid pressure operated means.

4. In a safety car control equipment, the combination with a brake cylinder and a brake valve device operative to effect the supply of fluid under pressure to the brake cylinder, of a manually operable member, an element operated by said member for operating said brake valve device, valve means operated by said element upon release of said manually operable member for controlling the supply of fluid under pressure to the brake cylinder, means operated by fluid under pressure for preventing the operation of said element to operate said brake valve means, manually operable power controlling means for controlling the supply of fluid under pressure to said fluid pressure operated means, a second fluid pressure operated means for operating said element to effect the operation of said brake valve device, and a manually controlled valve for controlling the supply of fluid under pressure to said second fluid pressure operated means.

5. In a safety car control equipment, the combination with a brake cylinder and a brake valve device operative to effect the supply of fluid under pressure to the brake cylinder, of a manually operable member, an element operated by said member for operating said brake valve device, valve means operated by said element upon release of said manually operable member for controlling the supply of fluid under pressure to the brake cylinder, means operated by fluid under pressure for operating said element to effect the operation of said brake valve device, and a manually controlled valve at each end of the car connected in series whereby either valve may be operated to control the supply of fluid under pressure to said means operated by fluid under pressure.

6. In a safety car control equipment, the combination with a brake cylinder and a brake valve device for controlling the application and release of the brakes, a brake valve operating lever responsive to the application of manual pressure for maintaining said valve device in release position and operative to an emergency position upon the relief of manual pressure, of a manually operable power controlling means, a fluid pressure actuated abutment means adapted to be moved into abutting relation with said brake valve operating lever to retain said brake valve device in release position when manual pressure is relieved from said brake valve operating lever, and valve means responsive to movement of said power controlling means for supplying fluid under pressure to said abutment means.

7. In a safety car control equipment, the combination with a brake cylinder, a brake valve device, an emergency pilot valve device, and an operating lever movable to effect the operation of either said brake valve device or said emergency pilot valve device, of a manually operable power control means for maintaining said operating lever in release position and operative upon the relief of manual pressure to effect movement of said emergency valve device, a fluid pressure actuated abutment means adapted to be moved into abutting relation with said operating lever to arrest its movement in release position, and valve means responsive to movement of said power control means toward a power on position to supply fluid under pressure to said abutment means to render it operative.

8. In a safety car control equipment, the combination with a brake cylinder, a brake valve device for controlling the application and release of the brakes, an emergency valve device, and a foot controlled operating lever responsive to the application of pressure for maintaining said brake valve device in release position and operative upon the relief of pressure to effect movement of said emergency valve device, of a manually operable power control means, a fluid pressure actuated abutment means adapted to be moved into abutting relation with said foot controlled operating lever to arrest its movement in release position, and a valve means responsive to movement of said power control means toward power on position to supply fluid under pressure to said abutment means to render it operative.

9. In a safety car control equipment, the combination with a brake cylinder, a brake valve device for controlling the application and release of the brakes, a foot controlled brake valve operating lever responsive to the application of manual pressure for maintaining said brake valve device in release position and operative to an emergency position upon the relief of manual pressure, of a manually operable power controlling means, a valve device adapted to be operated upon movement of said power controlling means toward power on position, and a fluid pressure actuated abutment means adapted to be supplied with fluid under pressure upon operation of said valve device to move said abutment means into abutting relation with said foot controlled lever to arrest said last named lever in release position.

10. In a safety car having double end control equipment, the combination with a brake cylinder, a brake valve device for controlling the application and release of the brakes, a foot controlled brake valve operating lever responsive to manual pressure applied from the operating end of the car for maintaining said brake valve operating lever in release position and operative to an emergency position upon the relief of pressure, of fluid pressure actuated means for retaining said brake valve operating lever in a brake application position when pressure is relieved from said foot controlled brake operating lever, and manually controlled valve means for controlling the supply of fluid under pressure to said fluid pressure actuated means.

11. In a safety car control equipment, the combination with a brake cylinder, a brake valve device for controlling the application and release of the brakes, a brake valve operating lever, means for normally maintaining said lever in an emergency position, foot controlled means associated with said lever responsive to the application of pressure for maintaining said lever in release position, of manually operable power control means, a fluid pressure responsive abutment means, a valve device operable upon the movement of said power control means toward a power on position to supply fluid under pressure to said abutment means and cause said abutment means to be moved into contact with said lever to arrest its movement in release position.

12. In a safety car having double end control equipment, the combination with a brake cylinder, a brake valve device for controlling the application and release of the brakes, a foot controlled brake valve operating lever responsive to manual pressure applied from the operating end of the car for maintaining said brake valve operating lever in release position and operative to an emergency position upon the relief of pressure, of a manually operable valve means, and a fluid pressure actuated abutment means adapted to be supplied with fluid under pressure upon actuation of said last named valve means to move said abutment means into engagement with said brake operating lever to actuate said lever to retain it in a brake application position.

13. In a safety car having double end control equipment, the combination with a brake cylinder, a brake valve device, an emergency valve device and a brake valve operating lever movable to effect the operation of either said brake valve device or said emergency valve device, of a manually operable power control means, a fluid pressure actuated abutment means, and valve means actuated upon movement of said power control means toward power on position to operate said abutment means to cause said abutment means to be moved into abutting relation with said brake valve operating lever to retain said lever in release position.

14. In a safety car control equipment, the combination with a brake cylinder, a valve casing containing a brake valve device, an emergency pilot valve device, an emergency valve device, a fluid pressure actuated abutment means, and a valve operating lever subject to foot control for effecting the operation of said brake valve device and automatically operable upon release of said foot control for effecting the operation of said emergency pilot valve device, of additional manual controlled means selectively operable to supply fluid under pressure to said abutment means to control the movement of said brake valve operating lever.

15. In a safety car control equipment, the combination with a brake cylinder, a valve casing containing a brake valve device, an emergency pilot valve device, an emergency valve device, a fluid pressure actuated abutment means, and a valve operating lever subject to foot control for effecting the operation of said brake valve device and automatically operable upon release of said foot control for effecting the operation of said emergency pilot valve device, of additional manual controlled means selectively operable to supply fluid under pressure to said abutment means to control the movement of said brake valve operating lever to retain said lever in release position.

16. In a safety car control equipment, the combination with a brake cylinder, a valve casing containing a brake valve device, an emergency pilot valve device, an emergency valve device, a fluid pressure actuated abutment means, and a valve operating lever subject to foot control for effecting the operation of said brake valve device and automatically operable upon release of said foot control for effecting the operation of said emergency pilot valve device, of additional manual controlled means selectively operable to supply fluid under pressure to said abutment means to control the movement of said brake valve operating lever to cause said operating lever to be moved to a brake application position.

17. In a safety car control equipment, the combination with a brake cylinder, a valve casing containing a brake valve device, an emergency pilot valve device, an emergency valve device, a fluid pressure actuated abutment means, and a valve operating lever subject to foot control for effecting the operation of said brake valve device and automatically operable upon release of said foot control for effecting the operation of said emergency pilot valve device, of manually operable power controlling means, valve means associated with said power controlling means adapted to be actuated upon movement of said power controlling means toward a power on position to supply fluid under pressure to said abutment means to cause said valve operating lever to be arrested in release position upon the release of pressure from said foot control.

18. In a safety car control equipment, the combination with a brake cylinder, a valve casing containing a brake valve device, an emergency pilot valve device, an emergency valve device, a fluid pressure actuated abutment means, and a valve operating lever subject to foot control for effecting the operation of said brake valve device and automatically operable upon release of said foot control for effecting the operation of said emergency pilot valve device, of manually operable valve means positioned at opposite ends of the car, one of which is adapted to be operated at the control end of the car for operating said abutment means to cause said valve operating lever to be actuated to and retained in a brake application position.

19. In a safety car control equipment, the combination with a brake cylinder, a valve casing containing a brake valve device, an emergency pilot valve device, an emergency valve device, a fluid pressure actuated abutment means, and a valve operating lever subject to foot control for effecting the operation of said brake valve device and automatically operable upon release of said foot control for effecting the operation of said emergency pilot valve device, of manually operable power controlling means positioned at opposite ends of the car and manually operable valve means positioned at opposite ends of the car, one of said manually operable power controlling means being adapted to be operated at the control end of the car, and valve means controlled by the operation of said last named means toward a power on position for supplying fluid under pressure to said abutment means to retain said valve operating lever in release position upon the release of pressure from said foot control.

FRANK B. THOMAS.